US011150972B1

(12) United States Patent
Cheruiyot et al.

(10) Patent No.: US 11,150,972 B1
(45) Date of Patent: Oct. 19, 2021

(54) SELF-REPORTING AND SELF-UPGRADING OF ENTERPRISE SYSTEMS

(71) Applicant: International Business Machines Corporation, Armonk, NY (US)

(72) Inventors: Kennedy Cheruiyot, Gardiner, NY (US); Edward C. McCain, Lagrangeville, NY (US); Ali Y. Duale, Poughkeepsie, NY (US); Akil Khamisi Sutton, Poughkeepsie, NY (US); Yufei Wu, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/872,418

(22) Filed: May 12, 2020

(51) Int. Cl.
*G06F 11/07* (2006.01)
*G06F 8/65* (2018.01)

(52) U.S. Cl.
CPC ............ *G06F 11/0748* (2013.01); *G06F 8/65* (2013.01); *G06F 11/079* (2013.01); *G06F 11/0772* (2013.01); *G06F 11/0793* (2013.01)

(58) Field of Classification Search
CPC ............ G06F 11/0748; G06F 11/0772; G06F 11/079; G06F 11/0793; G06F 8/65
See application file for complete search history.

(56) References Cited

U.S. PATENT DOCUMENTS

| | | | |
|---|---|---|---|
| 8,332,502 B1 * | 12/2012 | Neuhaus | H04L 41/0613 709/224 |
| 9,612,828 B2 | 4/2017 | Bertram et al. | |
| 10,129,109 B2 | 11/2018 | Venkata et al. | |
| 10,313,441 B2 | 6/2019 | Moiyallah, Jr. et al. | |
| 10,360,062 B2 | 7/2019 | Lietz et al. | |
| 10,410,156 B2 | 9/2019 | Lyras | |
| 10,425,316 B2 | 9/2019 | Yang et al. | |
| 2004/0117802 A1 | 6/2004 | Green | |
| 2011/0202483 A1 * | 8/2011 | Bergman | G06F 11/32 706/11 |
| 2013/0080641 A1 * | 3/2013 | Lui | H04L 43/045 709/226 |
| 2015/0304343 A1 | 10/2015 | Cabrera et al. | |
| 2016/0378454 A1 | 12/2016 | Nekrestyanov et al. | |
| 2017/0075748 A1 * | 3/2017 | Crosby | G06F 11/3006 |

(Continued)

OTHER PUBLICATIONS

Dumitras et al.; "Why Do Upgrades Fail and What Can We Do About It?", Middleware 10th ACM/IFIP/USENIX International Conference on, pp. 349-372, Nov. 30-Dec. 4, 2009.

(Continued)

*Primary Examiner* — Jigar P Patel
(74) *Attorney, Agent, or Firm* — Cantor Colburn LLP; Steven Chiu

(57) ABSTRACT

Aspects include monitoring for occurrences of selected events at a computer system, the monitoring by a processor that is coupled to the computer system. A list of event records for each of the selected events is built by the processor. The building of event records includes generating an event record for each occurrence of an event detected by the monitoring. The lists of event records for the selected events are merged into a merged list of event records that are in chronological order. A machine report for the computer system that includes the merged list of event records is stored.

17 Claims, 10 Drawing Sheets

(56) References Cited

U.S. PATENT DOCUMENTS

2018/0234496 A1* 8/2018 Ratias .................... A63F 13/60
2018/0293116 A1  10/2018 Segal et al.
2019/0190935 A1   6/2019 Peng et al.
2019/0230129 A1   7/2019 Digiambattista et al.

OTHER PUBLICATIONS

Fernandes, Antonio; "The Enterprise Operating System and Its Role in The Governace . . . of Enterprises", CEUR-WS Workshop on, vol. 2408, pp. 1-20, May 20-24, 2019.

Mukhiya et al.; "An Architectural Design For Self-Reporting E-Health Systems", SEH'19 1st ACM International Workshop on, pp. 1-8, May 27, 2019.

Zhang et al.; "Fast and Scalable VMM Live Upgrade in Large Cloud Infrastructure", ASPLOS'19 24th ACM International Conference on, pp. 93-105, Apr. 13-17, 2019.

* cited by examiner

HEALTHY DETECTION MATRIX (904)

| | System profile 1 (906a) | | | | | | System profile 2 (906b) | | | | | | System profile N (906N) | | | | | |
|---|---|---|---|---|---|---|---|---|---|---|---|---|---|---|---|---|---|---|
| | # OF ERRORS | HW LEVEL | S/W LEVEL | RUN TIME | WORKLOAD | REVIEW | # OF ERRORS | HW LEVEL | S/W LEVEL | RUN TIME | WORKLOAD | REVIEW | # OF ERRORS | HW LEVEL | S/W LEVEL | RUN TIME | WORKLOAD | REVIEW |
| 902a | 5 | 1 | 0 | 2 | 1X | 0 | 3 | 2 | 3 | 1 | 3X | 5 | 3 | 8 | 7 | 2 | 8X | 2 |
| 902b | 0 | 6 | 5 | 7 | 4X | 3 | 1 | 9 | 8 | 5 | 9X | 7 | 2 | 9 | 9 | 9 | 7X | 8 |
| 902c | 7 | 3 | 4 | 3 | 2X | -1 | 6 | 3 | 3 | 1 | 1X | -1 | 9 | 2 | 3 | 5 | 3X | -2 |
| 902d | 6 | 4 | 7 | 6 | 3X | 1 | 8 | 5 | 1 | 2 | 4X | -3 | 6 | 4 | 4 | 3 | 2X | -1 |
| ... | | | | | | | | | | | | | | | | | | |
| 902N | 5 | 7 | 5 | 5 | 6X | 8 | 6 | 9 | 9 | 5 | 6X | 8 | 9 | 2 | 3 | 5 | 3X | -2 |

FIG. 9

SELF-REPORTING AND SELF-UPGRADING OF ENTERPRISE SYSTEMS

BACKGROUND

The present invention generally relates to computer systems, and more specifically, to providing self-reporting and self-upgrading of enterprise systems.

SUMMARY

Embodiments of the present invention are directed to providing self-reporting and self-upgrading of enterprise systems. A non-limiting example method includes monitoring for occurrences of selected events at a computer system, the monitoring by a processor that is coupled to the computer system. A list of event records for each of the selected events is built by the processor. The building of event records includes generating an event record for each occurrence of an event detected by the monitoring. The lists of event records for the selected events are merged into a merged list of event records that are in chronological order. A machine report for the computer system that includes the merged list of event records is stored.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 depicts a block diagram of a matrix for determining the health of an enterprise system according to one or more embodiments of the present invention;

Figure 1:
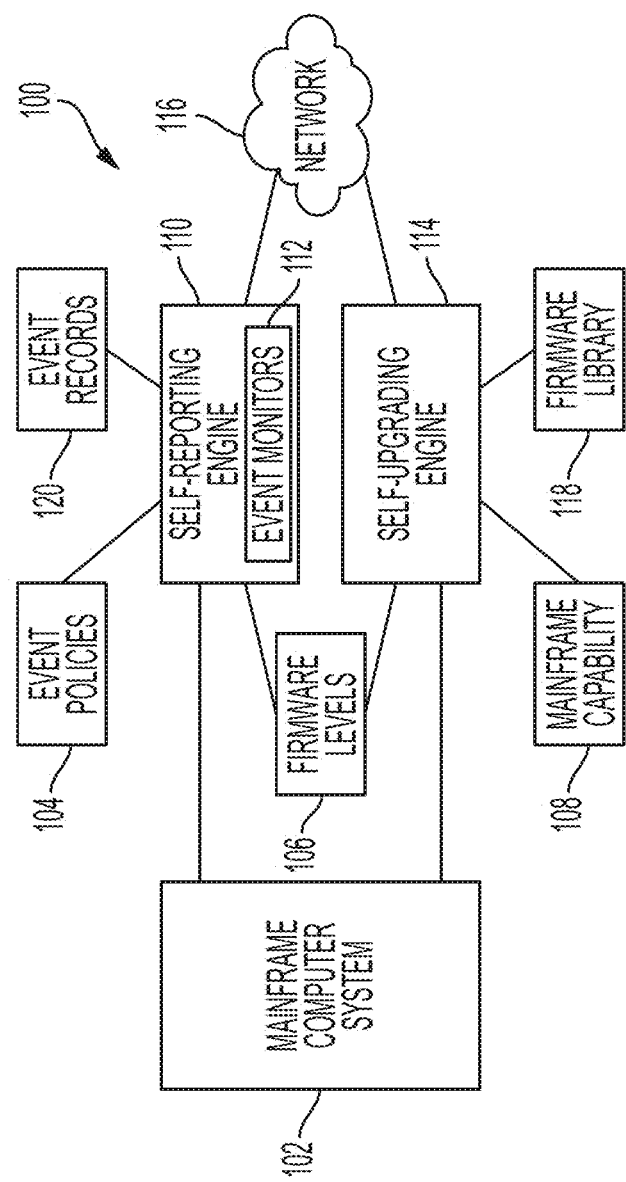
FIG. 1 depicts a block diagram of a system for providing self-reporting and self-upgrading of enterprise systems according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide self-reporting and self-upgrading of enterprise systems. The self-reporting allows an enterprise system to self-report on items such as, but not limited to their workloads, their computer code levels, their temperatures, and/or their downtimes. These self-reports can be shared with other enterprise systems to allow other enterprise systems to decide if they want to upgrade themselves to the code level of a given enterprise system.

It can be difficult when performing enterprise system testing to know the events that lead to a given enterprise system, or machine, failure. It can also be difficult for one machine to negotiate and evaluate the health of other machines of the same type in a test-floor network. An objective of enterprise system testing is for the systems being tested to increase their capabilities. To facilitate this, code that upgrades the capability of a machine is often copied from other machines or from a source library. Contemporary methods are largely manual, with an operator determining a current status of an enterprise system and whether the enterprise system requires an upgrade, and the operator selecting and installing the upgrade code on the enterprise system. In contrast to contemporary approaches, one or more embodiments of the present invention provide self-reporting which can be used to allow machines to upgrade themselves to the level of those machines that are determined to be healthy and that have newer levels of code.

For complex computer systems such as enterprise systems, it is common that both workloads and machine operators change quite often. Although knowing precise history (e.g., configuration changes) of what has transpired on a machine is important for error analysis, correct documentation of what has happened over a period of time is not always present. Such a lack of correct history may prolong or even mislead error analysis.

It can be common that prototype machines on a test-floor and/or in client data centers experience long test runs that are executed by many different individuals (e.g., operators and/or testers). Failures of such machines may not spontaneously happen; rather their root causes may be traced to one or more simple events that have happened prior to the failures being detected. A root cause event(s) may have occurred immediately prior to the failure being detected or in other cases it may have occurred minutes or hours or days prior to the failure being detected.

In accordance with one or more embodiments of the present invention, enterprise systems provide the context of their states using machine reports that augment the human logs of contemporary approaches to assist in error analysis. This self-reporting by enterprise systems can minimize efforts spent debugging complex failures and can allow sharing machine status with other machines.

Turning now to FIG. 1, a block diagram 100 of a system for providing self-reporting and self-upgrading of enterprise systems is generally shown in accordance with one or more embodiments of the present invention. FIG. 1 includes mainframe computer system 102 that is in communication with a self-reporting engine 110 and a self-upgrading engine 114. The mainframe computer system 102 is an example of an enterprise system, or machine. The self-reporting engine 110 shown in FIG. 1 is coupled to the mainframe computer system 102, to event policies 104 which define events being monitored for the mainframe computer system 102, to firmware levels 106 which specify the firmware currently being executed on the mainframe computer system 102, to event records 120 output by the self-reporting engine 110, and to a wired or wireless network 116. The self-upgrading engine 114 is coupled to the mainframe computer system 102, to the firmware levels 106, to mainframe capability 108 which specifies the capabilities of the mainframe computer system 102 (e.g., the processor speed), and to firmware library 118 which includes firmware code which can be installed on the mainframe computer system 102.

The network 116 shown in FIG. 1 may be implemented by any network known in the art such as, but not limited to a local area network (LAN), a direct cable connection, a cloud computing environment such as that shown below in FIG. 10, and/or the Internet.

Each of the event policies 104, event records 120, firmware levels 106, computer system capability 108, and firmware library 118 can be stored in a storage device as, for example a database or other type of storage data structure. In addition, the event policies 104, event records 120, firmware levels 106, computer system capability 108, and firmware library 118 can be accessed and updated by authorized users via a user interface (not shown in FIG. 1).

Figure 10:
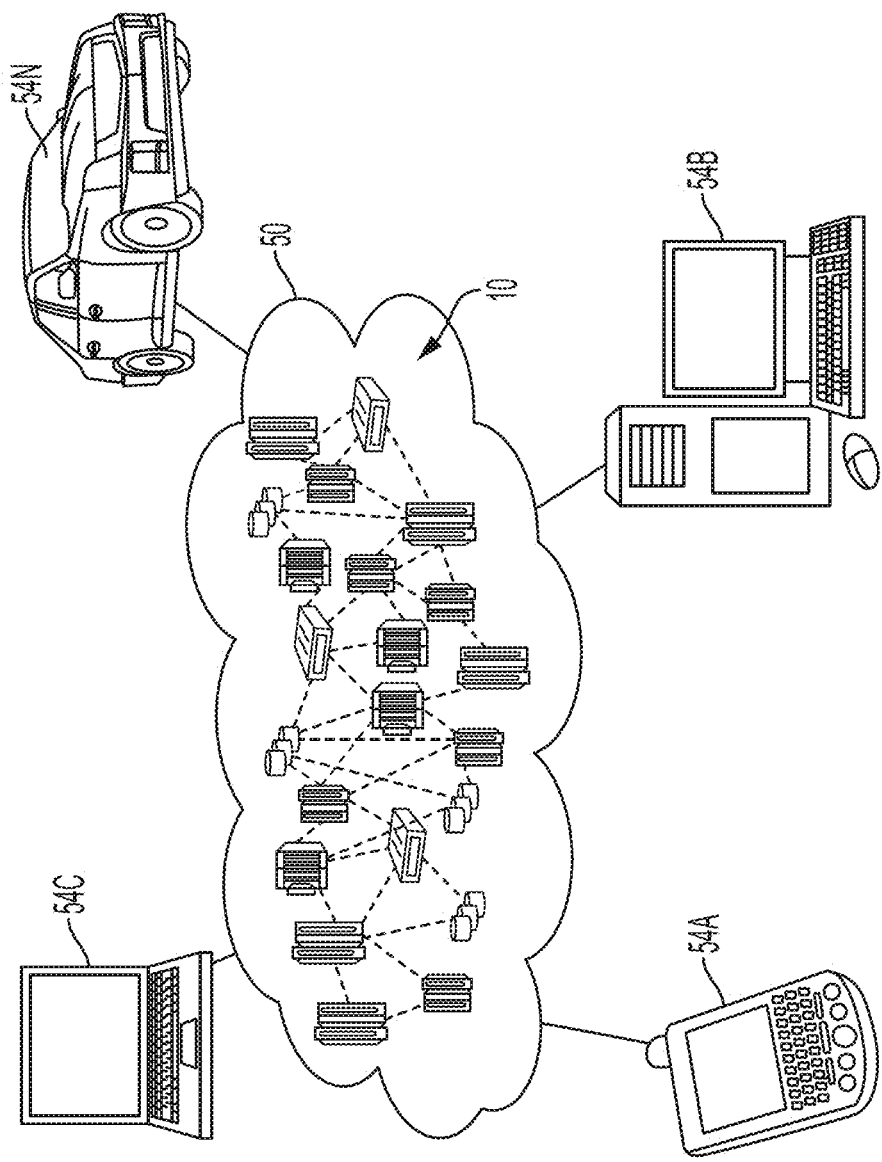
FIG. 10 depicts a cloud computing environment according to one or more embodiments of the present invention.
Figure 12:
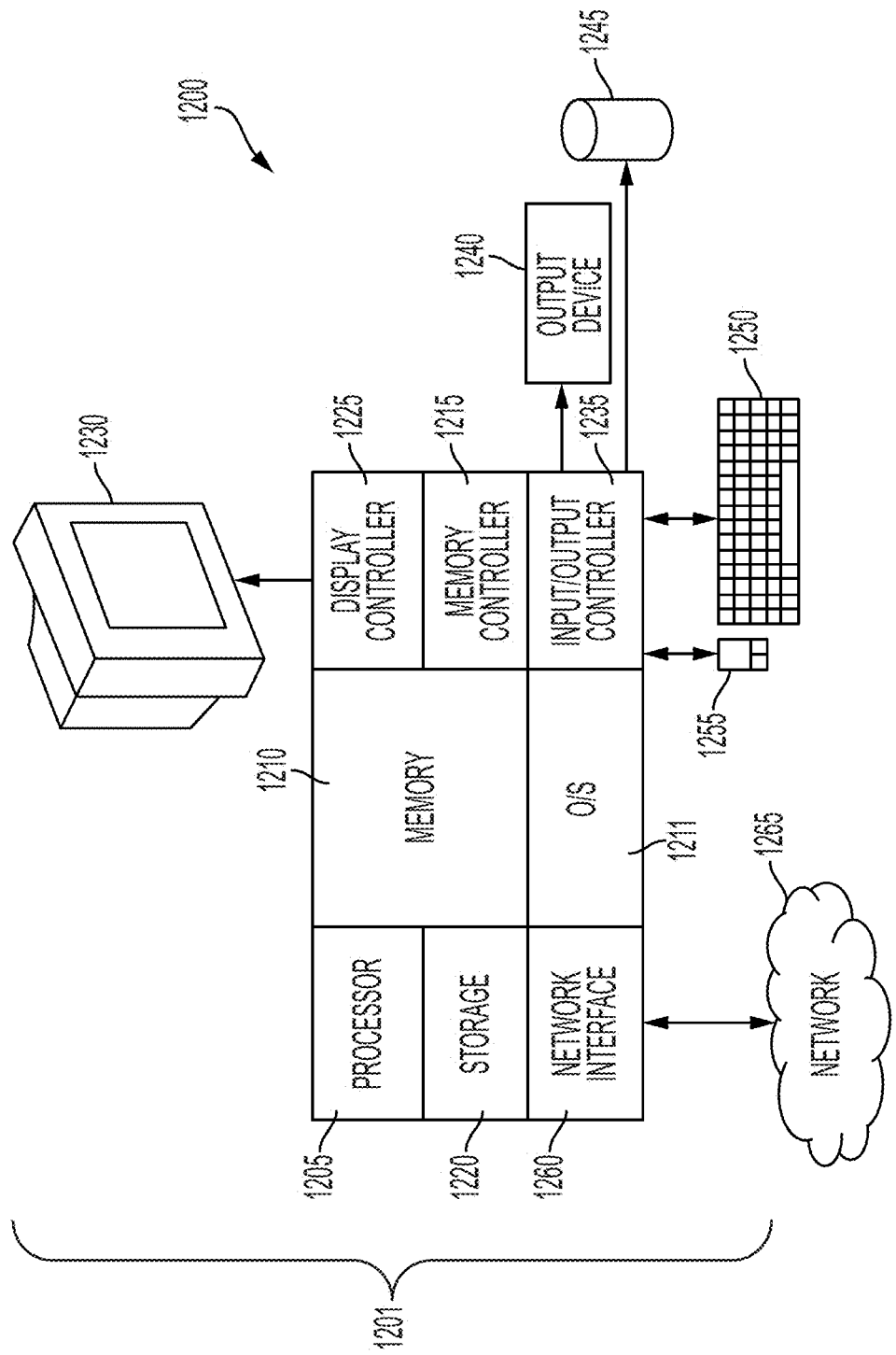
FIG. 12 illustrates a system for providing self-reporting and self-upgrading of enterprise systems according to one or more embodiments of the present invention.

The self-reporting engine 110 and the self-upgrading engine 114 can be executed, for example, on a processor 1205 located on computer 1201 of FIG. 12 and/or on a processor located on a cloud computing node 10 of FIG. 10, as further described herein.

The self-reporting engine 110 shown in FIG. 1 includes event monitors 112 for monitoring and recording events occurring at the mainframe computer system 102. Examples of events that can be recorded include, but are not limited to: each time the machine is powered-up (e.g., initial machine load or "IML"); any change in workload, an application starting or terminating; changes in configuration and/or configuration when a new workloads starts; temperature and power readings when there is a change in power or temperature or workload; idle time; runtime of a given workload (how long the task was running); meeting milestones such as achieving runtime and workload benchmarks, and missing milestones; firmware changes; and/or error reporting.

One or more embodiments of the present invention include event monitors 112 for monitoring a set of events at the system, or machine, and corresponding event policies 104. Each event monitor is designed for a specific event such as, but not limited to the workload, temperature, runtime without error and/or configuration. The event monitors 112 can access system log records/information and look for data related to specific events. In an embodiment where the system is executing z/OS® from IBM, records collected by system management facilities (SMF) can be monitored by the event monitors 112. Such event monitors 112 can utilize data mining as well as machine learning, and as an output can produce data for use by artificial intelligence (AI) machines for future prediction. During error analysis, data generated by the monitoring system can be analyzed to determine whether particular events occurred. For example, if a spike in temperature is detected, other events/feature changes that happened around the time when the temperature spiked are captured and analyzed using, for example, a machine learning algorithm which can be trained and used for future prediction. The trained machine learning algorithm, or machine, is an example of an AI machine. In this manner, although the spike of temperature is what is detected by an event monitor 112, earlier temperature records can be checked to investigate when the rise of temperature took place and data can be gathered about other events that took place at or around that time.

In accordance with one or more embodiments of the present invention, each of the event monitors 112 is paired with an enablement. In other words, a user can select which of the event policies 104 is enabled at any given time. An enablement can be set to be unconditional or conditional. For example, configuration change monitoring can be turned on (or enabled) unconditionally causing the configuration to be recorded after every so many microseconds, milliseconds, seconds, or other specified time period. At each of the specified time periods, event records 120 that include the current configuration of the mainframe computer system 102 are created. Configuration change monitoring can also be enabled conditionally causing, for example, the configuration to be recorded, as an event record, in response to detecting other specified events (e.g., a workload change).

Making correlations among the event records can facilitate error/failure diagnosis. For example, a record showing a recent change in configuration and/or workload around the time of the failure can save time when debugging the failure. Although individual event records 120 are collected independently, one or more embodiments of the present invention merges the records in chronological order (e.g., based on a time stamp included in each event record 120 or other manner of tracking chronological order). This allows the correlation of events that would otherwise be viewed as disjoint events. One or more embodiments of the present invention can also include creating customized reports and providing such reports on a regular basis or on-demand. In addition, output that can be used in machine learning can be produced. The machine learning can be used to predict and to possibly avoid future errors, or failures. Using the previous example of a spike in temperature being detected, it may also be determined that an error occurred around the time of the temperature spike. In this example, an event policy can be to monitor the temperature reading and to use the temperature reading to forecast or warn about a potential failure. For example, a warning of a possible failure can be generated when a temperature reaches a specified temperature threshold. This information, along with any changes on the features experienced with the change in temperature, can be tracked and fed into a machine learning algorithm for training and to help with future predictions. The embodiments described herein refer to firmware code, however one skilled in the art will recognize that the self-reporting and self-upgrading described herein is not limited to firmware and that they can be applied to any software installed on a processor.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

In addition, the various blocks in FIG. 1 may be configured in different manners than that shown in FIG. 1. For example, the self-reporting engine 110 and self-upgrading engine 114 may both be contained in a support element (SE) for the mainframe computer system 102. In another example, one or all of the event policies 104, event records 120, firmware levels 106, mainframe capability 108, and firmware library 118 are accessed via the network 116.

Figure 2:
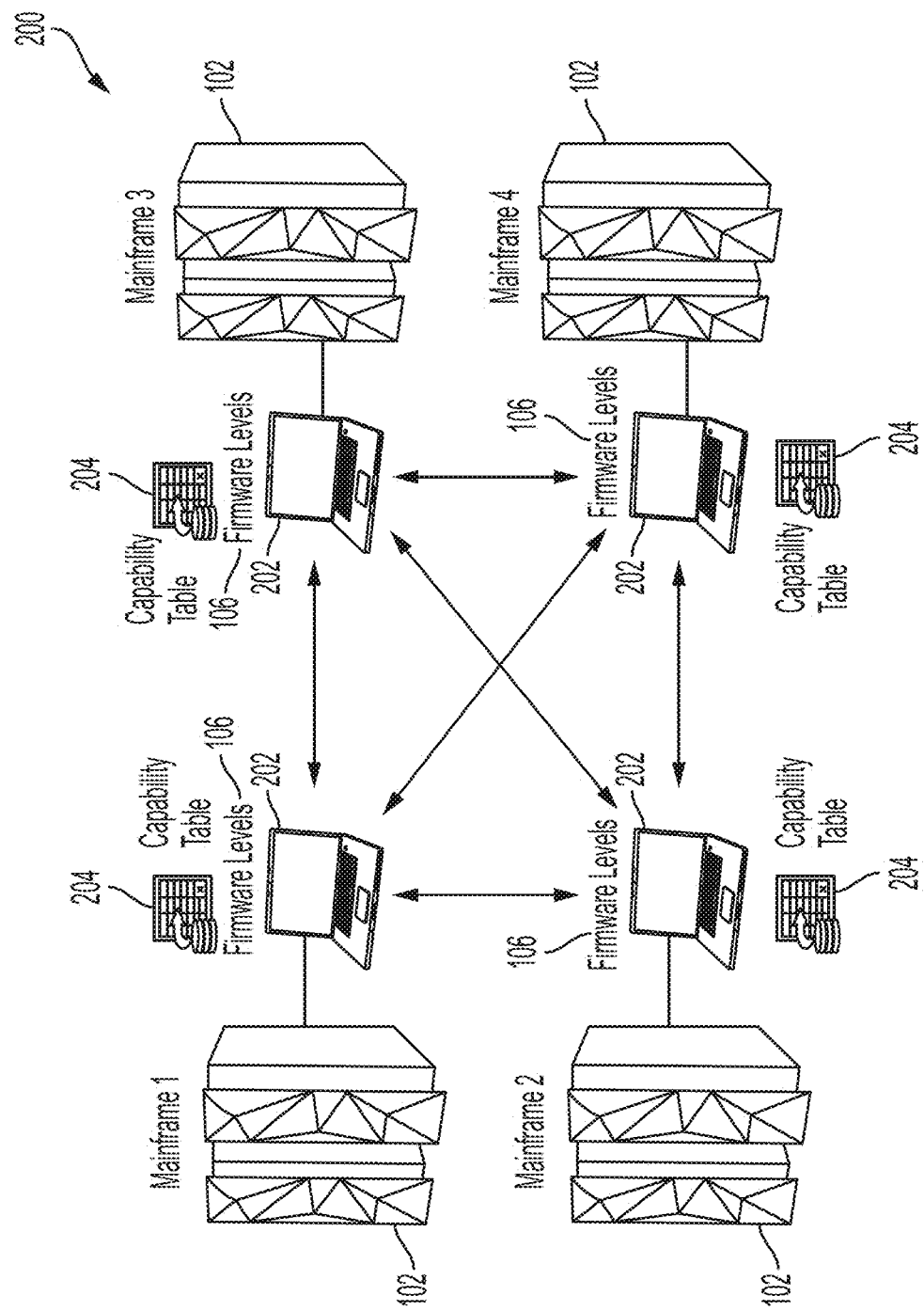
FIG. 2 depicts a block diagram of interconnected enterprise systems according to one or more embodiments of the present invention.

Turning now to FIG. 2, a block diagram 200 of interconnected enterprise systems is generally shown in accordance with one or more embodiments of the present invention. FIG. 2 depicts a plurality of mainframe computer systems 102 that are each coupled to a support element (SE) 202. Each SE 202 shown in FIG. 2 can include both the self-reporting engine 110 and the self-upgrading engine 114 of FIG. 1. As shown in FIG. 2 each SE 202 includes or has access to the firmware levels 106 for its respective mainframe computer system 102, as well as a capability table 204 which is an example implementation where the mainframe capability 108 of FIG. 1 and the firmware levels 106 are combined. The firmware levels for each of the mainframe computer systems 102 can vary. In accordance with one or more embodiments of the present invention, the capability table 204 describes capabilities of the firmware stack that is currently executing on the mainframe computer system 102 including for example, the supported operating system(s) (OSs) the processor speed, and a current level of the code/firmware executing on the mainframe computer system 102. In the embodiment shown in FIG. 2, the event policies 104, event records 120, and firmware library 118 of FIG. 1 are included in their respective SEs 202.

The SEs 202 shown in FIG. 2 are in communication with each other to share, for example their event records 120 which include configuration information and can be used to infer system health information for use by the self-upgrading engines 114. The mainframe computer systems 102 shown in FIG. 2 may be in the same data center and the SEs 202 may communicate via a local area network (LAN) and/or be physically connected to each other. In one or more other embodiments, the mainframe computer systems 102 are in different data centers and the SEs 202 communicate via a cloud computing environment 50 of FIG. 10 below. In accordance with one or more other environments, the event records 120 and optionally assessments of health for all of the mainframe computer systems 102, are stored in a central location that is accessible by each of the SEs 202.

Figure 3:
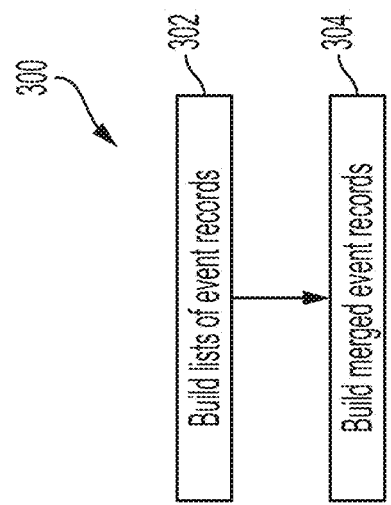
FIG. 3 depicts a flow diagram of building and merging lists of event records according to one or more embodiments of the present invention.

Turning now to FIG. 3, a flow diagram of a method 300 for building and merging lists of event records is generally shown in accordance with one or more embodiments of the present invention. All or a portion of the processing shown in FIG. 3 can be performed, for example, by a self-reporting engine, such as self-reporting engine 110 of FIG. 1, executing on processor 1205 located on computer 1201 of FIG. 12 or executing on a processor located on a cloud computing node 10 of FIG. 10.

Figure 4:
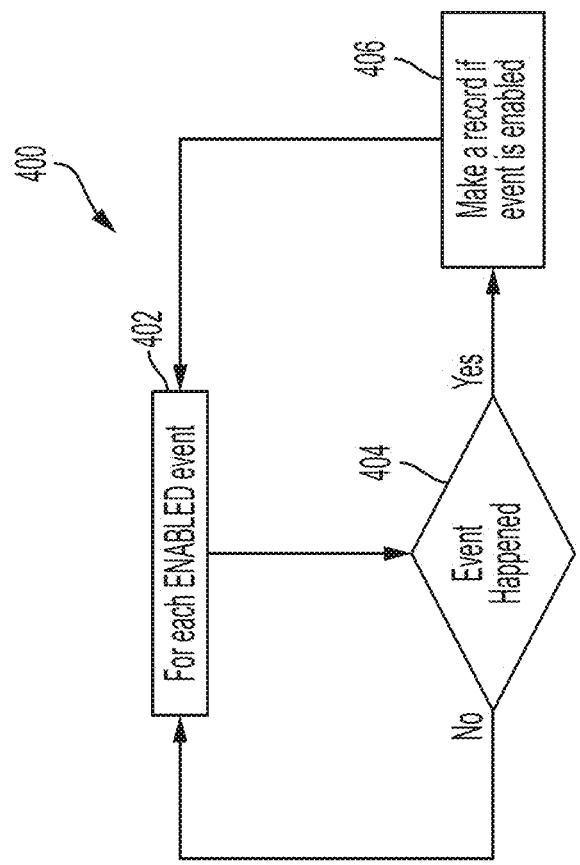
FIG. 4 depicts a flow diagram of building a list of event records according to one or more embodiments of the present invention.
Figure 5:
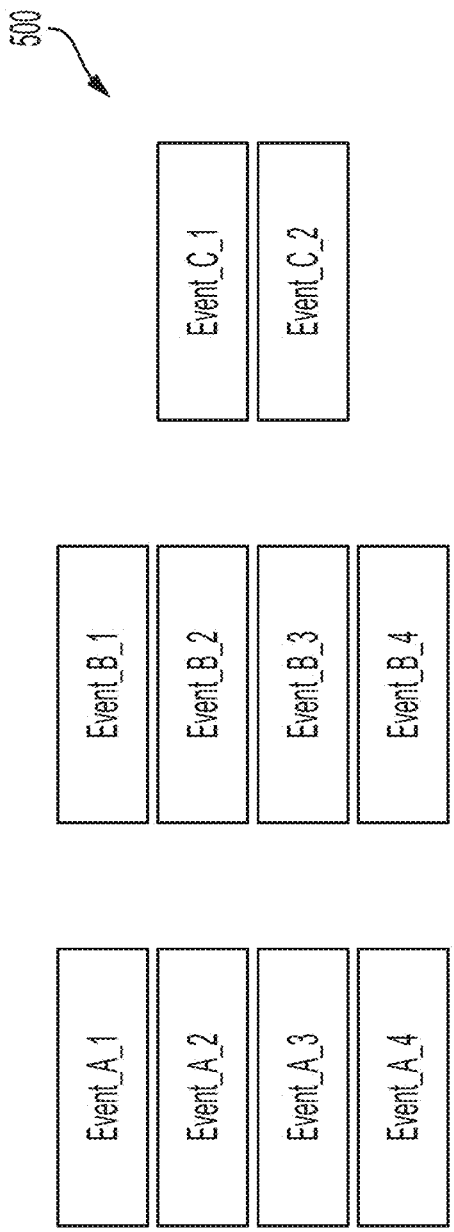
FIG. 5 depicts a block diagram of lists of event records according to one or more embodiments of the present invention.

In accordance with one or more embodiments of the present invention, the processing shown in FIG. 3 is performed independently by a self-reporting engine for each enterprise system that is in a group of enterprise systems that are performing self-reporting. At block 302, lists of event records, such as event records 120 of FIG. 1, are built using, for example, the event monitors 112 and event policies 104 of FIG. 1. An embodiment of a process for building the lists of event records is shown in FIG. 4 below and an embodiment of the lists of event records is shown in FIG. 5 below. At block 304, the lists of event records are merged to form merged event records which reflect a chronology of the different events that have been recorded in the event records. An embodiment of the merged event records is shown below if FIG. 6.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Turning now to FIG. 4, a flow diagram of a method 400 for building a list of event records is generally shown in accordance with one or more embodiments of the present invention. All or a portion of the processing shown in FIG. 4 can be performed, for example, by a self-reporting engine, such as self-reporting engine 110 of FIG. 1, executing on processor 1205 located on computer 1201 of FIG. 12 or executing on a processor located on a cloud computing node 10 of FIG. 10.

The processing shown in FIG. 4 starts at block 402 and monitoring is performed for each event that is being monitored by the self-reporting engine. In accordance with one or more embodiments of the present invention, event policies, such as event policies 104 of FIG. 1, indicate events that the self-reporting engine is monitoring (i.e., enabled events). As described previously, the self-reporting engine can monitor for specific events such as, but not limited to: each time the machine is powered-up; any change in workload, an application starting or terminating; changes in configuration and/or configuration when a new workloads starts; temperature and power readings when there is a change in power or temperature or workload; idle time; runtime of a given workload (how long the task was running); meeting milestones such as achieving runtime and workload benchmarks, and missing milestones; firmware changes; and/or error reporting. At block 404, it is determined whether an event that is being monitored has occurred.

In accordance with one or more embodiments of the present invention, the determining is based on reviewing SMF records and/or system log records that are being monitored for the event. The determining at block 404 can occur on a periodic basis (e.g., every second, every minute, etc.) and/or it may occur based on determining that another event has occurred. For example, the temperature of the computer system may be checked to see if it is over a specified threshold in response to detecting that the workload has increased past a specified level. If it is determined at block 404 that the event being monitored has occurred at the computer system, then block 406 is performed and an event record is generated to document the occurrence of the event and processing continues at block 402 with monitoring the event. If it is determined at block 404 that the event being monitored has not occurred, then processing continues at block 402 with monitoring the event.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Turning now to FIG. 5, a block diagram 500 of lists of event records is generally shown in accordance with one or more embodiments of the present invention. In the embodiment shown in FIG. 5, three events are being monitored, Event A, Event B, and Event C. Four occurrences of Event A were detected and recorded in the list of event records that includes event records labeled "Event_A_1", "Event_A_2", "Event_A_3", and "Event_A_4". Four occurrences of Event B were detected and recorded in the list of event records that includes event records labeled "Event_B_1", "Event_B_2", "Event_B_3", and "Event_B_4". Two occurrences of Event C were detected and recorded in the list of event records that includes event records labeled "Event_C_1" and "Event_C_2".

In accordance with one or more embodiments of the present invention, contents of each event record include, but are not limited to: an identifier of the event; a value of the detected event (e.g., a workload level, a temperature); and/or a time stamp or other indicator of the time that the event occurred.

Figure 6:
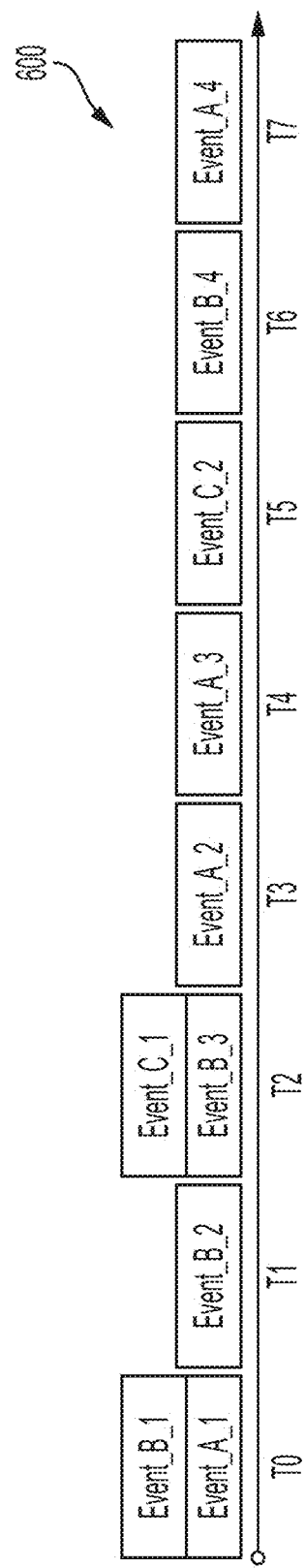
FIG. 6 depicts a block diagram of a merged list of event records according to one or more embodiments of the present invention.

Turning now to FIG. 6, a block diagram 600 of a merged list of event records is generally shown in accordance with one or more embodiments of the present invention. The merged list of event records shown in FIG. 6 reflects a chronology of when each of the events shown in FIG. 5 occurred. As shown in the block diagram 600 of FIG. 6, Event_B_1 and Event_A_1 both occurred in timespan "T0", Event_B_2 occurred in timespan "T1", Event_C_1 and Event_B_3 both occurred in timespan "T2", Event_A_2 occurred in timespan "T3", Event_A_3 occurred in timespan "T4", Event_C_2 occurred in timespan "T5", Event_B_4 occurred in timespan "T6", and Event_A_4 occurred in timespan "T7".

The block diagram 600 shown in FIG. 6 may indicate that Event_B_1 and Event_A_1 have an effect on each other since they both occurred in the same timespan. In addition, the occurrence of Event_B_3 may cause or have some impact on, the occurrence of Event_C_2 because they occur in consecutive timespans.

In accordance with one or more embodiments of the present invention, the length of each timespan is programmable and can be varied based on the type of analysis being performed. For example, for a high level analysis of a given failure(s) the timespan may be a week or a day or an hour; and once a particular timespan(s) is identified as a timespan of interest, it can be broken down into smaller intervals such as minutes or seconds or milliseconds to provide more detail about the timing of event occurrences.

It is common for a test floor system that is made up of multiple enterprise systems to have different code levels on different machines. Having different hardware and software levels can be due, for example, to the fact that error conditions, or bugs, may not show up on all machines on the test floor simultaneously and/or that fixes for problems need to be verified first before they are propagated to the whole network, or group, of machines in the test floor system. In accordance with one or more embodiments of the present invention, groups can also be formed, for example, based on ownership (e.g., departments, organization, company, etc.) or type of workload (e.g., high security, online, batch, high throughput, etc.).

In accordance with one or more embodiments of the present invention, the self-reporting described herein allows enterprise systems to decide if/when to upgrade themselves. In accordance with one or more embodiments of the present invention, each machine reads the logs, or machine reports, created by all other machines in the group and finds those machines that have higher (i.e., newer) code levels. The machine checks the level of confidence of those machines with the higher code levels, or capabilities. In accordance with one or more embodiments of the present invention, the machine checks to see if the selected machines with higher capabilities ran long enough, encountered a tolerable number of errors, were previously mimicked and given good ratings, and/or ran with operating systems (OSs) that are relevant to the copying machine. Based on the results of the checking, the machine may mimic, or upgrade its code levels to code levels (e.g., software or firmware) of one of the machines with higher capabilities. In addition, the machine may provide feedback indicating whether the mimicking met expectations or not.

Figure 7:
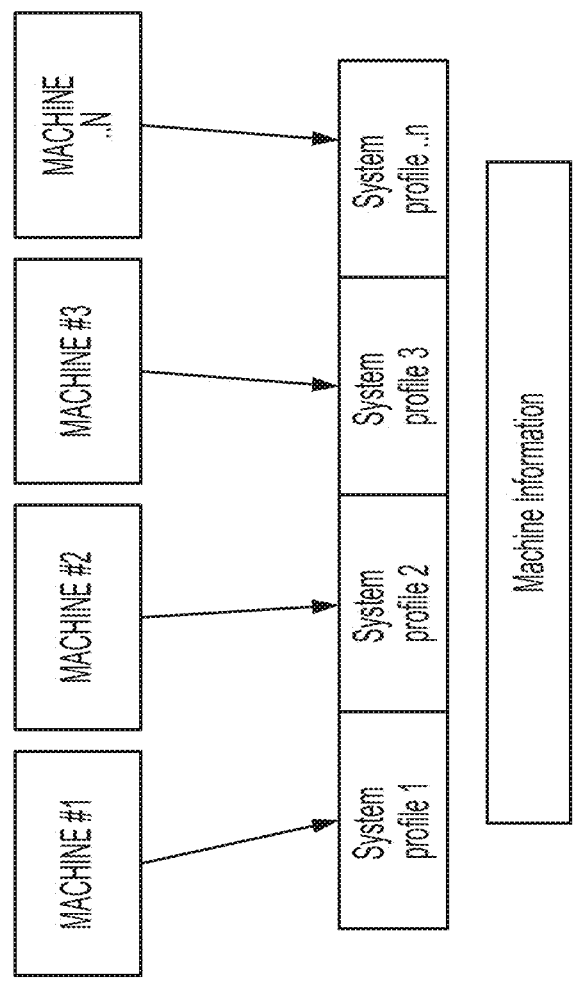
FIG. 7 depicts a block diagram of enterprise system information for a plurality of information systems.

Turning now to FIG. 7, a block diagram of system profiles, or machine reports, for a plurality of computer systems is generally shown in accordance with one or more embodiments of the present invention. As shown in FIG. 7, information about each of a plurality of computer systems ("MACHINE #1", "MACHINE #2", "MACHINE #3", AND "MACHINE . . . N") is stored in a machine information storage location that is accessible by the other computer systems in the group of computer systems. As shown in FIG. 7, the machine reports ("System profile 1" for "MACHINE #1", "System profile 2" for "MACHINE #2", "System profile 3" for MACHINE #3, and "System profile . . . N" for MACHINE #N) for each of the machines are stored in a common storage location. The common machine information storage location may be implemented by a database or indexed data file or other suitable storage arrangement.

The stored machine information is used by each of the computer systems in the group to monitor the status of other computer systems in the group and to make decisions about whether to upgrade to the hardware and/or software levels of any of the other computer systems. Examples of data stored in a machine report for each computer system include, but is not limited to: a merged list of event records; hardware levels of the computer system; software levels installed on the computer system; historic or current workload (volume and/or type such as online transactions, batch programs, high security, etc.) on the computer system; a health assessment of the computer system; capabilities of the computer system; and/or computing goals (e.g., quality of service goals) of the computer system.

Figure 8:
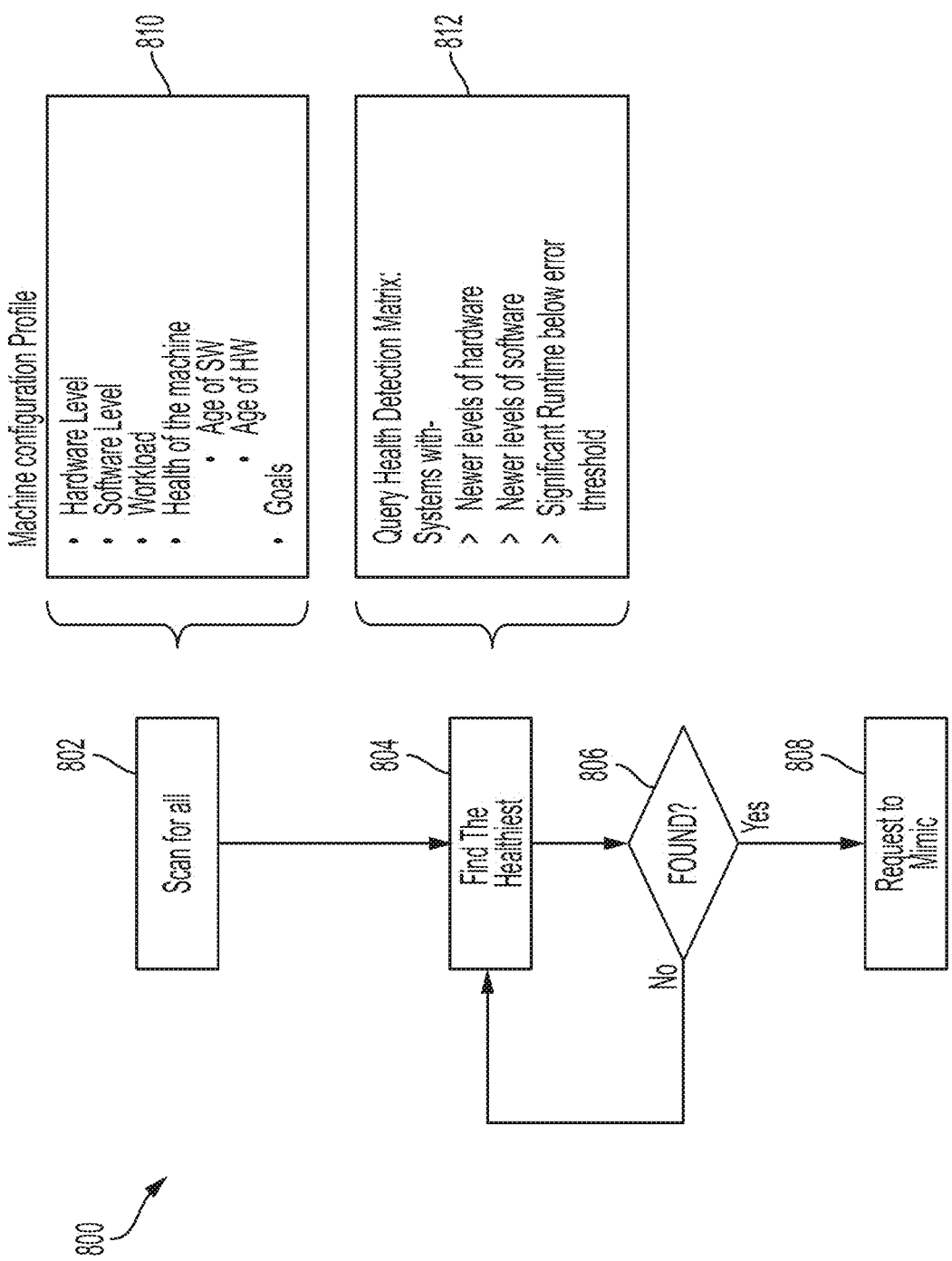
FIG. 8 depicts flow diagram of self-upgrading of enterprise systems according to one or more embodiments of the present invention.

Turning now to FIG. 8, a flow diagram of a method 800 of self-upgrading of enterprise systems is generally shown in accordance with one or more embodiments of the present invention. All or a portion of the processing shown in FIG. 8 can be performed, for example, by a self-upgrading engine, such as self-upgrading engine 114 of FIG. 1, executing on processor 1205 located on computer 1201 of FIG. 12 or executing on a processor located on a cloud computing node 10 of FIG. 10.

The processing shown in FIG. 8 starts at block 802, with scanning the machine information 810, or system profiles, of computer systems in a group of computer systems (e.g., other machines on the test floor) to determine information 810 such as, but not limited to: their hardware levels, software levels, workload, indicators of the health of the machine (e.g., age of the current software and/or hardware that is installed), and computing goals. At block 804 the self-upgrading engine determines the health of the machines in the group based on characteristics 812 such as, but not limited to the machine having newer levels of hardware, newer levels of software, and/or the machine having executed for at least a threshold amount of time with less than a threshold number of errors. Both the threshold amount of time and the threshold number of errors are programmable and may vary between implementations.

Once the healthiest machine in the group of machines is identified, as determined at block 806, a request to upgrade to, or to mimic, the machine may be performed at block 808. In accordance with one or more embodiments of the present invention, the upgrading is performed automatically based, for example, at least in part on the current firmware level of the machine (e.g., as stored in firmware levels 106 of FIG. 1) and copies of the new code (e.g., stored in firmware library 118 of FIG. 1). If the machine coupled to the self-upgrading engine performing the method of FIG. 8 is determined to be the healthiest machine in the group, then block 806 is not performed. In accordance with one or more embodiments of the present invention, if the incremental difference in health between the machine and the healthiest machine in the group is less than a programmable threshold, then block 806 is not performed. The identity of the healthiest machine in the group may vary depending on the which computer in the group is executing the self-grading engine. This can be due, for example, to different system profiles, different machine capabilities, and/or different types of workload being executed.

The process flow diagram of FIG. 8 is not intended to indicate that the operations of the method 800 are to be executed in any particular order, or that all of the operations of the method 800 are to be included in every case. Additionally, the method 800 can include any suitable number of additional operations.

Turning now to FIG. 9, a block diagram of a healthy detection matrix 904 for use in determining the health of the machines at block 804 of FIG. 8 is generally shown in accordance with one or more embodiments of the present invention.

The healthy detection matrix 904 shown in FIG. 9 includes system profile tables 906*a*, 906*b*, . . . 90*b*N, collectively referred to herein as system profile tables 906 that track selected characteristics from the machine reports over time for each of the machines in the group. Each system profile table 906 corresponds to a system profile for a machine in the group. In FIG. 9, "System profile 1" is the system profile for MACHINE #1, "System profile 2" for MACHINE #2, and "System profile N" for MACHINE #N. Each of the system profile tables 906 shown in FIG. 9 include columns that each represent a characteristic that is being tracked and rows 902 that each represent a machine in the group of machines. In FIG. 9, row 902*a* of the system profile tables 906 represents MACHINE #1, row 902*b* represents MACHINE #2, row 902*c* represents MACHINE #3, row 902*d* represents MACHINE #4, and so until row 902N which represents MACHINE #N. Rows 902*a*, 902*b*, 902*c*, 902*d* . . . 902N are referred to collectively herein as machine rows 902.

The characteristics, or features of interest, tracked by the columns shown in the embodiment of FIG. 9 include a number of errors, a hardware level, a software level, a run time, a workload, and a review. In accordance with one or more embodiments of the present invention, characteristics are collected from other machines in the group, or cluster, and categorized based on their respective machine profiles. In one or more exemplary embodiments, the number of errors includes a number of reported errors from machine runs/logs; the hardware level includes the type of hardware versions/revisions; the software level includes the software version in the system; the run time includes the amount of time that the particular configuration has been running; the workload includes the type of work that the machine is running/testing; and the review is a score that is determined based on the system configuration of the machine in the machine row 902. The review score for upgrading to a particular system profile can vary depending on the system profile of the machine to be upgraded.

As shown in FIG. 9, the values in the system profile tables 906 are scaled. For example, for the hardware and software level characteristics shown in FIG. 9, "9" is the newest/highest level and "0" is the oldest/lowest level. In addition, as shown in the example in FIG. 9, "X" is a type of workload and "2X" indicates twice as much of the workload as "X." In accordance with one or more embodiments of the present invention, the characteristics, or features, are fed into a machine learning algorithm such as, but not limited to a support-vector machine (SVM) and/or a neural network to produce the value in the review column of the system profile table 906. In accordance with one or more embodiments of the present invention, the value, or score, of the review column reflects the machine's health rating measurement, and in the example shown in FIG. 9 ranges from −10 to 10. The higher the number, the better the rating.

For example, row 902*d* in FIG. 9, corresponds to MACHINE #4, and based on the contents of the healthy detection matrix 904 it may not make sense to upgrade MACHINE #4 at the point in time represented by the healthy detection matrix 904. This is because, upgrading MACHINE #4 to System profile 2 (which is currently being executed on MACHINE #2) has a review score of "−3" and upgrading MACHINE #4 to System profile N (which is currently being executed on MACHINE #N) has a review score of "−1". Both review scores are negative and in accordance with an embodiment indicate that a degradation (e.g., in performance or capacity or security, etc.) is predicted to occur if the upgrade is performed. In addition, a relatively small benefit may be realized, as indicated by a "1" in the review column by upgrading MACHINE #4 to System profile 1. MACHINE #N, on the other hand may benefit greatly from being upgraded to either System profile 1 or System profile as both have a review score of "8".

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
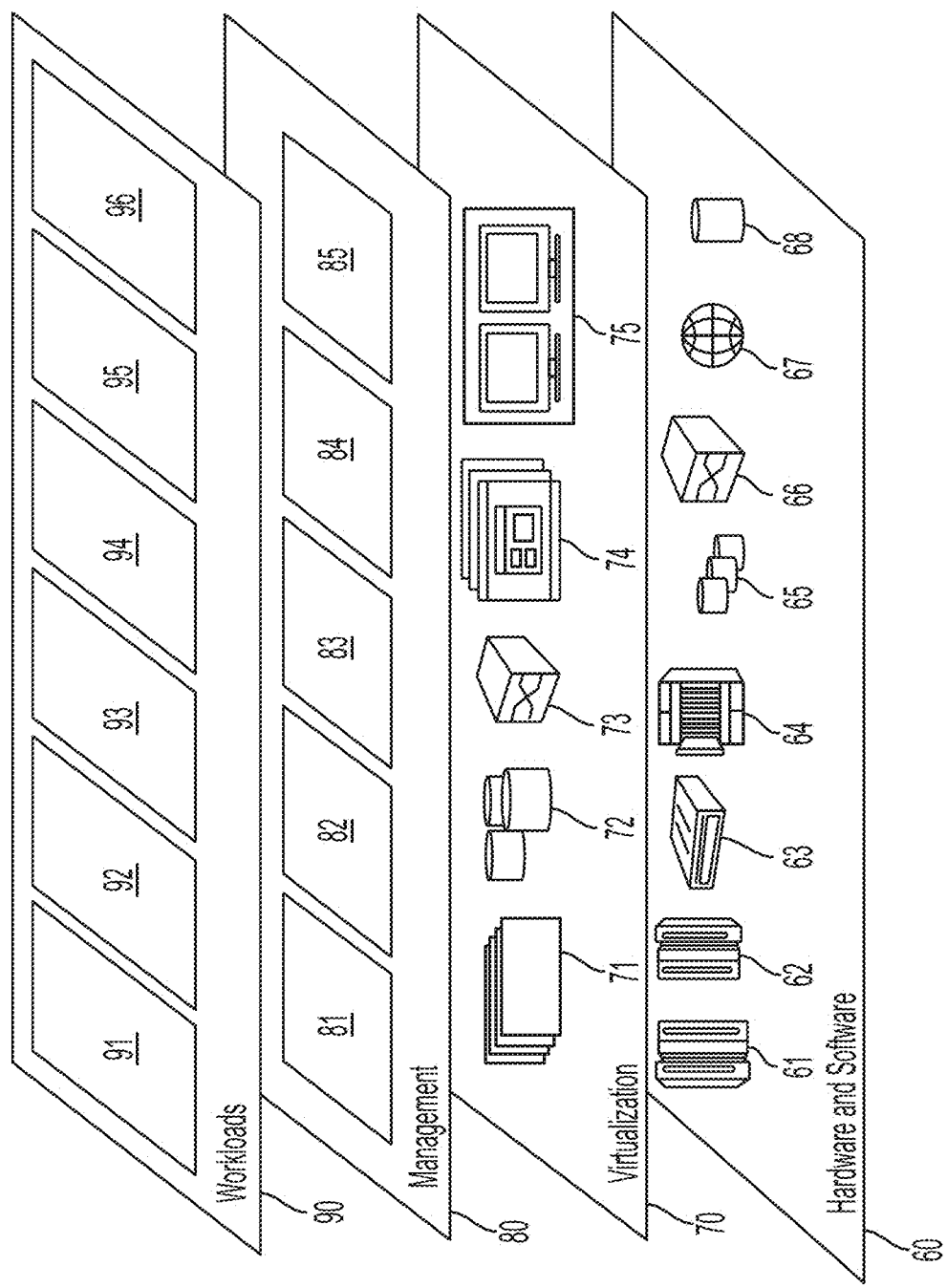
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and breakpoint generation %.

It is understood that one or more embodiments of the present invention are capable of being implemented in conjunction with any type of computing environment now known or later developed.

Turning now to FIG. 12, a computer system for self-reporting and self-upgrading of enterprise systems is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 1200 therefore may include general-purpose computer or mainframe 1201 capable of running multiple instances of an O/S simultaneously.

In one or more exemplary embodiments of the present invention, in terms of hardware architecture, as shown in FIG. 12, the computer 1201 includes one or more processors 1205, memory 1210 coupled to a memory controller 1215, and one or more input and/or output (I/O) devices 1240, 1245 (or peripherals) that are communicatively coupled via a local input/output controller 1235. The input/output controller 1235 can be, for example but not limited to, one or more buses or other wired or wireless connections, as is known in the art. The input/output controller 1235 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 1235 may include a plurality of sub-channels configured to access the output devices 1240 and 1245. The sub-channels may include fiber-optic communications ports.

The processor 1205 is a hardware device for executing software, particularly that stored in storage 1220, such as cache storage, or memory 1210. The processor 1205 can be any custom made or commercially available processor, a central processing unit (CPU), an auxiliary processor among several processors associated with the computer 1201, a semiconductor based microprocessor (in the form of a microchip or chip set), a macroprocessor, or generally any device for executing instructions.

The memory 1210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, and/or other types of storage media. Note that the memory 1210 can have a distributed architecture, where various components are situated remote from one another, but can be accessed by the processor 1205.

The instructions in memory 1210 may include one or more separate programs, each of which comprises an ordered listing of executable instructions for implementing logical functions. In the example of FIG. 12, the instructions in the memory 1210 a suitable operating system (OS) 1211. The operating system 1211 essentially controls the execution of other computer programs and provides scheduling, input-output control, file and data management, memory management, and communication control and related services.

In accordance with one or more embodiments of the present invention, the memory 1210 may include multiple logical partitions (LPARs) each running an instance of an operating system. The LPARs may be managed by a hypervisor, which may be a program stored in memory 1210 and executed by the processor 1205.

In one or more exemplary embodiments of the present invention, a conventional keyboard 1250 and mouse 1255 can be coupled to the input/output controller 1235. Other output devices such as the I/O devices 1240, 1245 may include input devices, for example but not limited to a printer, a scanner, microphone, and the like. Finally, the I/O devices 1240, 1245 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1200 can further include a display controller 1225 coupled to a display 1230.

In one or more exemplary embodiments of the present invention, the system 1200 can further include a network interface 1260 for coupling to a network 1265. The network 1265 can be an IP-based network for communication between the computer 1201 and any external server, client and the like via a broadband connection. The network 1265 transmits and receives data between the computer 1201 and external systems. In an exemplary embodiment, network 1265 can be a managed IP network administered by a service provider. The network 1265 may be implemented in a wireless fashion, e.g., using wireless protocols and technologies, such as WiFi, WiMax, etc. The network 1265 can also be a packet-switched network such as a local area network, wide area network, metropolitan area network, Internet network, or other similar type of network environment. The network 1265 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1201 is a PC, workstation, intelligent device or the like, the instructions in the memory 1210 may further include a basic input output system (BIOS) (omitted for simplicity). The BIOS is a set of essential software routines that initialize and test hardware at startup, start the OS 1211, and support the transfer of data among the hardware devices. The BIOS is stored in ROM so that the BIOS can be executed when the computer 1201 is activated.

When the computer 1201 is in operation, the processor 1205 is configured to execute instructions stored within the memory 1210, to communicate data to and from the memory 1210, and to generally control operations of the computer 1201 pursuant to the instructions. In accordance with one or more embodiments of the present invention, computer 1201 is an example of a cloud computing node 10 of FIG. 10.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   monitoring for occurrences of selected events at a computer system, the monitoring by a processor that is coupled to the computer system;
   building, by the processor, a list of event records for each of the selected events, the building comprising generating an event record for each occurrence of an event detected by the monitoring;
   merging the lists of event records for the selected events into a merged list of event records that are in chronological order;
   storing a machine report for the computer system, the machine report comprising the merged list of event records;
   accessing, by the processor, machine reports for a plurality of other computer systems;
   sharing, by the processor, the machine report with the plurality of other computer systems, wherein at least a subset of the plurality of other computer systems decide whether to upgrade their software levels based at least in part on the machine report; and determining, by the processor, based at least in part on the machine reports for the plurality of other computer systems and the machine report for the computer system, whether to upgrade current levels of software installed on the computer system to one or more other levels of software installed on one of the plurality of other computer systems.

2. The method of claim 1, further comprising performing the upgrade based at least in part on results of the determining.

3. The method of claim 1, further comprising:
receiving a report of an error condition on the computer system; and
diagnosing possible causes of the error condition based at least in part on the machine report.

4. The method of claim 3, further comprising applying a fix to the computer system based at least in part on the diagnosing.

5. The method of claim 1, wherein the machine report further comprises a hardware level of hardware installed on the computer system and a software level of software installed on the computer system.

6. The method of claim 1, wherein the machine report further comprises a workload on the computer system.

7. The method of claim 1, wherein the machine report further comprises one or both of an assessment of a health of the computer system and a computing goal of the computer system.

8. The method of claim 1, wherein the machine report is accessible by another processor that is coupled to at least one other computer system.

9. A system comprising:
one or more processors for executing computer readable instructions, the computer readable instructions controlling the one or more processors to perform operations comprising:
monitoring for occurrences of selected events at a computer system, the monitoring by a processor of the one or more processors that is coupled to the computer system;
building, by the processor, a list of event records for each of the selected events, the building comprising generating an event record for each occurrence of an event detected by the monitoring;
merging the lists of event records for the selected events into a merged list of event records that are in chronological order;
storing a machine report for the computer system, the machine report comprising the merged list of event records;
accessing, by the processor, machine reports for a plurality of other computer systems;
sharing, by the processor, the machine report with the plurality of other computer systems, wherein at least a subset of the plurality of other computer systems decide whether to upgrade their software levels based at least in part on the machine report; and
determining, by the processor, based at least in part on the machine reports for the plurality of other computer systems and the machine report for the computer system, whether to upgrade current levels of software installed on the computer system to one or more other levels of software installed on one of the plurality of other computer systems.

10. The system of claim 9, wherein the operations further comprise performing the upgrade based at least in part on results of the determining.

11. The system of claim 9, wherein the operations further comprise:
receiving a report of an error condition on the computer system; and
diagnosing possible causes of the error condition based at least in part on the machine report.

12. The system of claim 11, wherein the operations further comprise applying a fix to the computer system based at least in part on the diagnosing.

13. The system of claim 9, wherein the machine report further comprises a hardware level of hardware installed on the computer system and a software level of software installed on the computer system.

14. The system of claim 9, wherein the machine report further comprises a workload on the computer system.

15. The system of claim 9, wherein the machine report further comprises one or both of an assessment of a health of the computer system and a computing goal of the computer system.

16. The system of claim 9, wherein the machine report is accessible by another processor that is coupled to at least one other computer system.

17. A computer program product comprising a non-transitory computer readable storage medium having program instructions embodied therewith, the program instructions executable by one or more processors to cause the one or more processors to perform operations comprising:
monitoring for occurrences of selected events at a computer system, the monitoring by a processor of the one or more processors that is coupled to the computer system;
building, by the processor, a list of event records for each of the selected events, the building comprising generating an event record for each occurrence of an event detected by the monitoring;
merging the lists of event records for the selected events into a merged list of event records that are in chronological order;
storing a machine report for the computer system, the machine report comprising the merged list of event records;
accessing, by the processor, machine reports for a plurality of other computer systems;
sharing, by the processor, the machine report with the plurality of other computer systems, wherein at least a subset of the plurality of other computer systems decide whether to upgrade their software levels based at least in part on the machine report; and
determining, by the processor, based at least in part on the machine reports for the plurality of other computer systems and the machine report for the computer system, whether to upgrade current levels of software installed on the computer system to one or more other levels of software installed on one of the plurality of other computer systems.

\* \* \* \* \*